Jan. 10, 1956 G. W. HARTWELL 2,730,296
UNLOADER MECHANISM FOR COMPRESSORS
Filed Aug. 9, 1952 2 Sheets-Sheet 1

GEORGE W. HARTWELL
*INVENTOR.*

Jan. 10, 1956  G. W. HARTWELL  2,730,296
UNLOADER MECHANISM FOR COMPRESSORS
Filed Aug. 9, 1952  2 Sheets-Sheet 2

GEORGE W. HARTWELL
INVENTOR.

United States Patent Office 2,730,296
Patented Jan. 10, 1956

2,730,296

UNLOADER MECHANISM FOR COMPRESSORS

George W. Hartwell, Granby, Mass., assignor to Worthington Corporation, Harrison, N. J., a corporation of Delaware Application August 9, 1952, Serial No. 303,621

6 Claims. (Cl. 230—24)

This invention relates generally to fluid compressors and more particularly to a solenoid operated unloader mechanism for unloading air or gas compressors.

Unloading mechanisms for compressors employing a solenoid have been used in which the solenoids are generally energized when it is desirable or necessary that the compressor is unloaded.

Where the solenoid is located in the head of the compressor it has been found that under certain operating conditions the temperature will increase in the head to a point where the solenoid temperature exceeds the safe insulation temperature of the wire in the coils thereof.

Accordingly, the present invention is to provide a mechanism wherein a mechanical means is combined with the solenoid operation so that the mechanical means maintains the inlet valve open for unloading the compressor and the solenoid is energized to load the compressor whereby in the energized position the solenoid will be cooled by the suction air being drawn in during the loading period of operation.

It is an object of the present invention to provide a compressor unloading device employing a spring actuated lever means for normally maintaining the inlet valve of the compressor open or in the unloaded position and adapted to coact with a solenoid for closing said inlet valve to avoid subjecting said solenoid to increased temperatures which occur during the unloading of the compressor.

Another object of the present invention is to provide a combination with said unloading mechanism in the form of a time delay switch and a pressurestat control switch which will maintain the compressor in the normally unloaded position after starting until the operating prime mover "picks up" normal operating speed and to thereafter allow the compressor to load and unload responsive to various predetermined suction pressure or discharge pressure conditions or load demands as expressed by pressure in the reservoir into which the compressor discharges, or in a chamber from which the cylinder receives the gas.

With this and other objects in view, as may appear from the accompanying specification, the invention consists of various features of construction and combination of parts, which will be first described in connection with the accompanying drawings, showing unloader mechanism for compressors of a preferred form embodying the invention, and the features forming the invention will be specifically pointed out in the claims.

Figure 1:
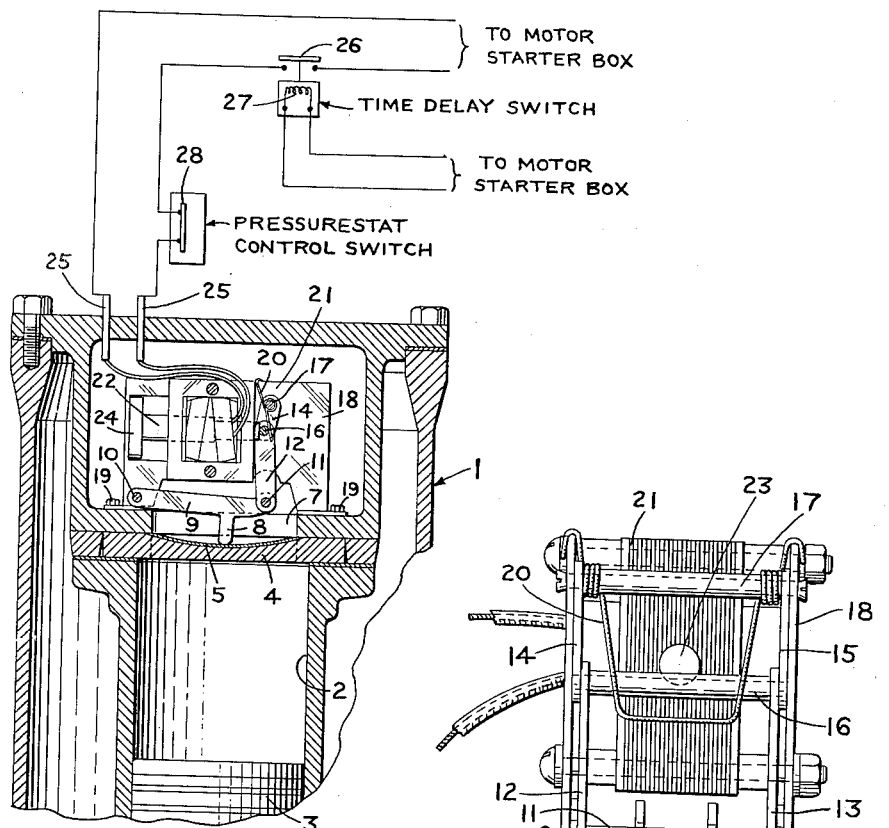
Figure 1 shows a vertical section through a compressor having one form of the invention mounted therein.
Figure 2:
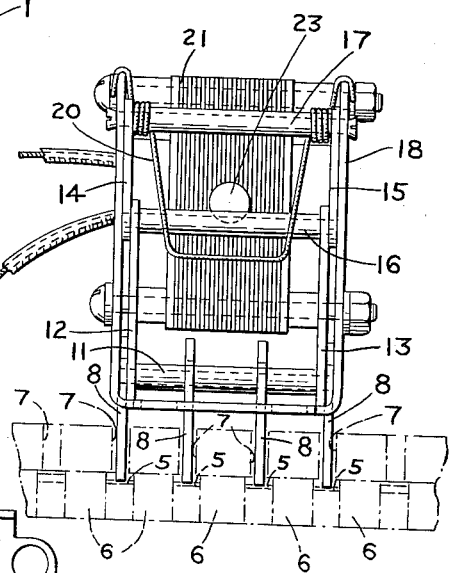
Figure 2 is an end view showing this form of the invention.

Referring more particularly to the drawings, Figure 1 shows a fluid compressor of any approved type embodying a cylinder 2 and a piston 3. The compressor includes an inlet valve 4 which in the present application is shown as the flexible strip type valve wherein a thin "featherlike" valve strip 5 flexes between an open and a closed position, moving upwardly or downwardly as shown in Figures 1 and 2, into its respective bowed valve opening position to open the communicating passages 6 and moving flat into straight valve closing position to close the inlet passages 7. While this particular type of valve known in the compressor trade as a "feather" valve is shown in the drawings, it is understood that the unloading mechanism of the present invention may be employed with any suitable type of compressor inlet valve without departing from the spirit of the present invention.

Figures 1 and 2 show the valve strips 5 each engaged by unloading fingers 8 which extend into inlet passages 7 provided on inlet valve 4 in the head of the cylinder 2 of the compressor 1. The unloading fingers 8 are in turn at the ends thereof remote from the end adapted to engage the feather valve strips 5 formed integrally in T fashion with support arms 9 pivotally connected at one end to a pivot shaft 10.

The support arms 9 at the other end are pivotally connected to an operating shaft 11 operated by paired lower linkage arms 12 and 13 and upper linkage arms 14 and 15, to move the support arms 9 upwardly and downwardly so that the unloading fingers 8 can in turn open and close the inlet passage 4 by engaging and disengaging the flexible valve strip 5, as is hereinafter described.

The paired lower linkage arms 12 and 13 are pivotally connected between the operating shaft 11 and an intermediate or actuating shaft 16 while the paired upper linkage arms 14 and 15 are pivotally connected between the intermediate shaft 16 and a fixed shaft 17 all of which is clearly shown in Figures 1 and 2 of the drawings.

The pivot shaft 10 and the fixed shaft 17 are transversely disposed on a solenoid frame 18 supported in any suitable manner such as by threaded members 19 in the head of the compressor as is shown in Figure 1 of the drawings. The intermediate shaft 16 is thus free to move to and fro within the limits of the lengths of the upper and lower linkages 12 and 14 and 13 and 15 respectively.

A return spring 20 is adapted to abut and actuate the intermediate or actuating shaft 16 to normally maintain the inlet valve 4 in the unloaded or open position at all times when the solenoid coil 21 mounted in the solenoid frame 18 is not being energized.

The solenoid coil 21 which may be of any approved electrical construction for solenoids of which there are many purchasable on the open market includes a slidable plunger 22 axially disposed in the coil 21. The plunger 22 is longer than the coil 21 by an axial projection 23 of reduced cross sectional area continuous therewith.

In the de-energized position the return spring 21 will act on the intermediate or actuating shaft 16 to move it into abutting relationship with the extended axial projection 23 whereby the plunger 22 will be moved rearwardly until a stop shoulder 24 formed on the end thereof of remote from the axial projection 23 will engage and abut the solenoid frame 17 which will limit further movement of the plunger 22 and hence the movement of the intermediate or actuating shaft 16.

In this above described position the intermediate shaft 16 will be just beyond the dead center line formed when the fixed shaft 17, intermediate shaft 16 and operating shaft 11 are in alignment with each other or just past the maximum extension position of the paired upper and lower linkage arms 12 and 14, and 13 and 15 respectively. This position is most advantageous as it locks in place the said linkage arms to normally hold the inlet valve 4 in the open or unloaded position and the pressure of the flexible valve strips 5 against the unloader fingers 8 cannot lift the unloader fingers 8 and close the inlet valve 4 until the solenoid is energized. It is obvious therefore that if the head tends to heat up in the unloaded position that since the solenoid is de-energized in this position that no excessive temperatures will result which might affect the insulation factor on the solenoid coil adversely.

The solenoid coil 21 is connected in the electric circuit which energizes the motor (not shown) operating the compressor 1 through suitable leads 25. Connected in the electrical circuit between the solenoid coil 21 and the energizing source (not shown) are two control elements, namely, a switch 26, which is operated by a time delay relay 27 of any approved construction, and a pressurestat control 28 also of any approved construction and both of which are easily purchasable on the open market.

The time delay actuated switch structure 26 and 27 is connected in the energizing circuit which controls operation of the motor (not shown) so that when the compressor is first started this switch is held open and will remain open until the motor has gained operating speed, so that the solenoid coil 21 will not be energized and the inlet valve 4 will be held in its normally unloaded position.

After this starting up period the time delay actuated switch structure 26 and 27 will act to close the circuit and thus energize the solenoid coil 21 which moves the plunger 22 and the axial extension 23 thereof until the stop shoulder 24 is brought into abutment with the coil 21. Since the axial extension 23 is in constant abutment with the intermediate or actuating shaft 16 it will move shaft 16 and return spring 20 to bend or shorten the paired upper and lower linkage arms 12 and 14 and 13 and 15 respectively as a result of which the operating shaft 11 will raise the support arm 9 and the unloading fingers 8 connected thereto and allow the flexible valve strips 5 to close the inlet passages 7 of the inlet valve 4 to load the compressor 1.

In the loaded position the solenoid coil is thus energized, but since cool suction gases will pass over the energized coil to the inlet valve 4, it is maintained at a temperature which eliminates any problem of insulation safety and prolongs the life of the coil itself.

When the solenoid is de-energized the return spring 20 will act on the intermediate or actuating shaft 16 and the plunger 22 to place the inlet valve 4 in the unloaded positions as above described.

The unloading and loading of the compressor 1 will thus become a function of the energizing or de-energizing of the solenoid coil 21, and in the circuit shown, be controlled by the pressurestat control 28 which comes into operation in the closed position of switch 26 after the initial starting up process above described.

The pressurestat control 28 may have its pressure actuated elements (not shown) connected in the suction line of the compressor so that while the compressor is running and when the suction pressure reaches a predetermined degree, i. e., the degree at which the pressurestat control 28 is set to deenergize the solenoid to allow the return spring 20 to act on the intermediate or actuating shaft 16 to maintain the inlet valve in the normally unloaded position as above described.

Since the only force that the plunger 22 must overcome is the spring 20, the plunger will be free to move until it reaches the limit or center position of the solenoid coil, thus preventing vibration and burning out of the solenoid coil during the energized period.

Figure 3:
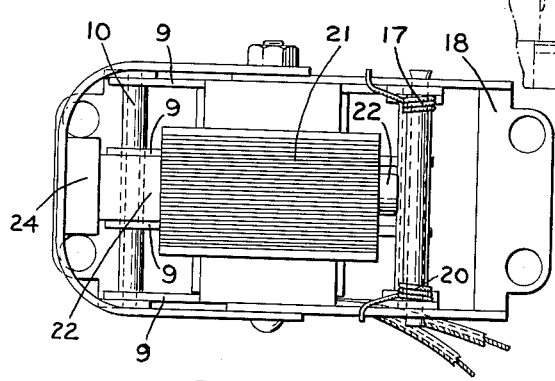
Figure 3 is a plan view showing this form of the invention.
Figure 4:
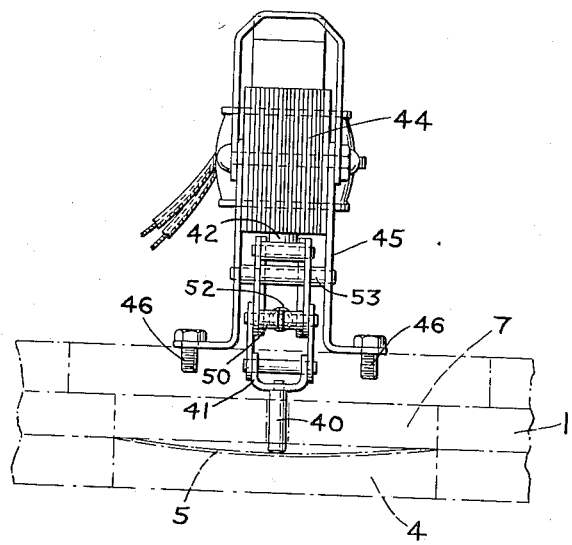
Figure 4 is a front view of a modified form of the invention.
Figure 5:
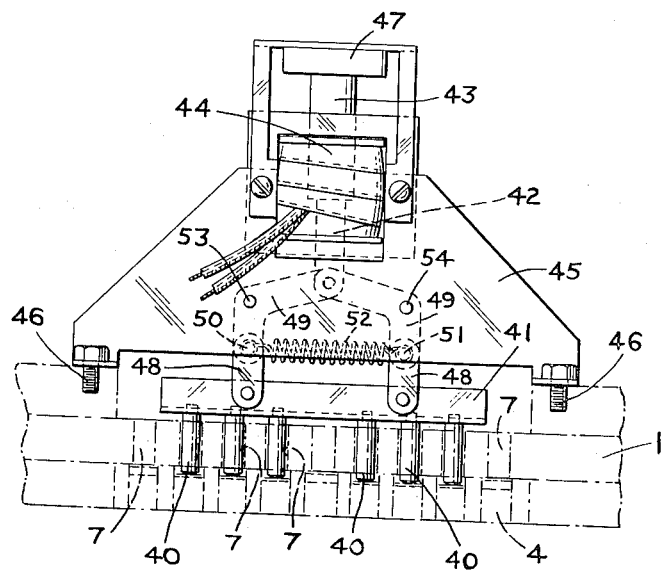
Figure 5 is an end view of the modified form of the invention.

Figures 4 and 5 show a modified form of linkage arrangement to give a mechanical advantage to the solenoid plunger when it is acting in a plane approximately parallel to the axial line of the cylinder rather than in a plane approximately perpendicular to the axial line of the cylinder as in the form of the invention shown in Figures 1, 2 and 3.

The compressor 1, the inlet valve 4 and the relationship of the solenoid in the electrical circuit hence are unchanged and Figures 4 and 5 show therefore only a fragment of the compressor 1 and the inlet valve 4 in phantomized view the parts thereon being identical with those shown in the form of the invention shown in Figures 1, 2 and 3.

Hence, the flexible valve strips 5 in the modified linkage arrangement will be engaged by unloading fingers 40 which are disposed on an unloading finger support bar 41 and extend into the inlet passages 7 of the inlet valve 4 to engage the flexible valve strips 5.

The finger support bar 41 is connected through a linkage arrangement hereinafter described to an axial projection 42 continuous with a solenoid plunger 43 slidable axially in a solenoid coil 44 in turn fixedly mounted in a solenoid frame 45 connected in the head of the compressor 1 by suitable threaded members 46, as is clearly shown in Figures 4 and 5 of the drawings. The plunger 43 and the axial projection 42 are longer than the solenoid coil 44 and the axial projection 42 will extend outwardly of the coil 44 on movement of the plunger 43 until a stop shoulder 47 on the upper end of the plunger 43 is brought into abutment with the solenoid coil 44. The plunger 43 will of course be moved when the solenoid coil 44 energized as was above described for the solenoid coil 21 of the form of the invention shown in Figures 1, 2 and 3 of the drawings.

The linkage arrangement connecting the support bar 41 to the axial projection 42 includes two paired lower linkage arms 48 and two paired upper linkage arms 49.

Each of the lower linkage arms 48 is identical in construction and each pair of linkage arms 48 are in spaced relation to each other and have one arm thereof disposed on either side of the support bar 41 so that one end is pivotally connected to the support bar 41 and the other end to a pair of actuating shafts 50 and 51 which are normally drawn towards each other by a resilient member or spring 52.

Each of the upper linkage arms 49 are identical in construction being substantially L-shaped so that they can be pivotally mounted at the vertex on one or the other of fixed shafts 53 and 54 transversely connected to the solenoid frame 45. One leg of each of the linkage arms 48 will be pivotally connected to its respective actuating shaft 50 and the other end of each linkage arm 49 will be pivotally connected to the outer end of the axial projection 42.

Since the spring member 52 which normally tends to move the actuating shafts 50 and 51 towards each other is always acting thereon and by reason of the pivotal mounting on the fixed shafts 53 and 54, the L-shaped upper linkage arm 49 will similarly try to move the axial projection 42 and the plunger 43 continuous therewith upwardly or out of the solenoid coil 44 when it is not energized. However, the stop shoulder 47 will stop this upward movement by abutment with the solenoid frame 45, as is clearly shown in Figure 5 of the drawing.

In this position, the linkage arms 48 and 49, as long as the solenoid remains deenergized, will hold the unloading fingers 40 in engagement with the flexible valve strips 5 and hence the inlet valve 4 will be normally maintained in the unloaded position.

When the solenoid coil 44 is energized as was above described in the arrangement for the solenoid coil 21 which arrangement as was stated is unchanged for this modified form, the plunger 43 will be pulled downwardly until the stop shoulder 47 abuts the coil 44. This causes the axial projection to pivot the upper linkage arms 49 and move the ends thereof connected to the actuating shafts 50 and 51 away from each other and thereby draw the shafts 50 and 51, the lower linkage arms 48, the support bar 41 and the unloading fingers 40 upwardly to close the inlet valve 4 and thus load the compressor 1.

The solenoid coil 44 will, of course, be energized and deenergized responsive to the pressurestat control 28, it being clearly understood that the coil will only be energized in the loaded position and when deenergized the inlet valve will at all times be held in the unloaded position.

It will be understood that the invention is not to be limited to the specific construction or arrangements of parts shown, but that they may be widely modified within the invention defined by the claims.

What is claimed is:

1. In an unloader mechanism for compressors the combination with a compressor having an inlet valve, of at least one unloader finger for moving said valve into open position to unload the compressor, a mechanical advantage linkage means including paired upper linkage arms and paired lower linkage arms pivotally connected to said unloader finger and for actuating said unloader finger, a resilient member in engagement with said linkage means for normally maintaining said inlet valve in the unloaded position, and an electric solenoid including a plunger operatively connected to said linkage means and resilient member for loading said compressor at a predetermined suction pressure.

2. In an unloader mechanism for compressors the combination with a compressor including a cylinder and an inlet valve to said cylinder in the head of said compressor, of an electric solenoid including a solenoid coil mounted in a solenoid frame in the head of said compressor, a plunger slidably mounted in said coil and moved when said coil is energized, stop means for controlling the movement of said plunger and an axial projection continuous with said plunger adapted to extend outwardly of said coil when the coil is energized, at least one unloader finger for moving said inlet valve into open position to unload the compressor, a support bar for said unloader finger, linkage means connected between said solenoid frame and said support bar including paired upper linkage arms and paired lower linkage arms, and an actuating shaft pivotally connecting said upper and lower linkage arms to each other, a resilient member in engagement with said actuating shaft to normally maintain said inlet valve in the unloaded position, and said axial projection adapted to engage said actuating shaft and to coact with the shaft and the resilient member for loading the compressor at predetermined suction pressures.

3. In an unloader mechanism as claimed in claim 2 wherein said plunger and axial projection are moved substantially perpendicular with respect to the axial line of said cylinder and the actuating shaft is disposed perpendicular to the axial line of said axial projection.

4. In an unloader mechanism for compressors the combination with a compressor including a cylinder and an inlet valve to said cylinder in the head of said compressor, of an electric solenoid including a solenoid coil mounted in a solenoid frame in the head of said compressor, a plunger slidably mounted in said coil and moved when said coil is energized, stop means for controlling the movement of said plunger and an axial projection continuous with said plunger adapted to extend outwardly of said coil when the coil is energized, at least one unloader finger for moving said inlet valve into open position to unload the compressor, a support bar for said unloader finger, linkage means connected between said solenoid frame and said support bar including paired upper linkage arms and paired lower linkage arms, and an actuating shaft pivotally connecting said upper and lower linkage arms to each other, a resilient member in engagement with said actuating shaft to normally maintain said inlet valve in the unloaded position, and said axial projection connected to said paired upper linkage arms to coact with said actuating shaft and said resilient member for loading the compressor at a predetermined suction pressure.

5. In an unloader mechanism as claimed in claim 4 wherein said plunger and axial projection are moved substantially parallel to the axial line of said cylinder and the support bar is disposed perpendicular to the axial line of the axial projection.

6. In an unloader mechanism for compressors the combination with a compressor having a suction air passage communicating with the head thereof and an inlet valve disposed in said head, of an electric solenoid including a solenoid coil mounted in a solenoid frame disposed in said air passage and to be cooled by air passing therethrough when said compressor is loaded, a plunger slidably mounted in said coil and moved when said coil is energized, stop means for controlling the movement of said plunger, and an axial projection on said plunger adapted to extend outwardly of the coil when the coil is energized, at least one unloader finger for moving said inlet valve into open position to unload the compressor, yieldable mechanical advantage means in said head connected to said unloader finger for normally maintaining said inlet valve in the unloaded position, and said plunger to operatively contact said yieldable mechanical advantage means for loading said compressor at a predetermined suction pressure.

References Cited in the file of this patent

UNITED STATES PATENTS

| | | |
|---|---|---|
| 858,468 | Richards | July 2, 1907 |
| 1,936,411 | Schneider | Nov. 21, 1933 |
| 2,040,964 | Tarleton | May 19, 1936 |
| 2,062,052 | Horlacher | Nov. 24, 1936 |
| 2,274,338 | Cody | Feb. 24, 1942 |
| 2,389,348 | Dustin | Nov. 20, 1945 |
| 2,443,286 | Weston | June 15, 1948 |
| 2,681,177 | Hartwell | June 15, 1954 |